United States Patent [19]
Burkhardt et al.

[11] 3,955,793
[45] May 11, 1976

[54] VALVE STEM STATIC SEAL SYSTEM

[75] Inventors: Joseph A. Burkhardt, New Orleans; Thomas W. Childers, Mandeville, both of La.

[73] Assignee: Exxon Production Research Company, Houston, Tex.

[22] Filed: June 21, 1974

[21] Appl. No.: 481,731

[52] U.S. Cl. ................................. 251/95; 251/96
[51] Int. Cl.² .................................... F16K 35/04
[58] Field of Search ............... 251/90, 95, 96, 214, 251/266, 333; 137/381, 382, 382.5

[56] References Cited
UNITED STATES PATENTS

| | | | |
|---|---|---|---|
| 881,060 | 3/1908 | Cook | 251/333 X |
| 1,795,839 | 3/1931 | Credle | 251/266 X |
| 3,272,224 | 9/1966 | Wrenshall | 137/382 |
| 3,529,805 | 9/1970 | Callahan et al. | 251/214 X |
| 3,773,080 | 10/1973 | Raschke | 251/96 |
| 3,788,600 | 1/1974 | Allen | 251/266 X |

*Primary Examiner*—Henry T. Klinksiek
*Attorney, Agent, or Firm*—John S. Schneider

[57] ABSTRACT

A valve stem system is described for use in submerged oil and/or gas production systems designed to improve the reliability of subsea valves. A remotely rotatable pressure cap is threadedly engagable onto and removable from a valve bonnet which is mounted on a valve. The valve bonnet surrounds one section of the valve stem of the valve and forms a metal-to-metal seal with the cap when the cap is threadedly made up on the valve bonnet. Another section of the valve stem extends into the cap. A spline is arranged on that section of the valve stem. A spline clutch is arranged on the interior of the cap and is engagable with the spline of the valve stem to cause, when engaged, rotation of the valve stem upon rotation of the cap. A coil spring is arranged within the cap to push or urge the spline clutch into engagement with the valve stem spline when the cap is removed from the valve bonnet. Bearings arranged between the valve bonnet and the valve stem permit rotation of the valve stem relative to the valve bonnet. The sections of the valve stem may be separate members and a detent clutch arrangement may be used to connect these sections in order to limit overtorquing of the valve stem and associated valve. The pressure cap is rotated by a manipulator effector which rotates an extension shaft connected to the pressure cap.

10 Claims, 4 Drawing Figures

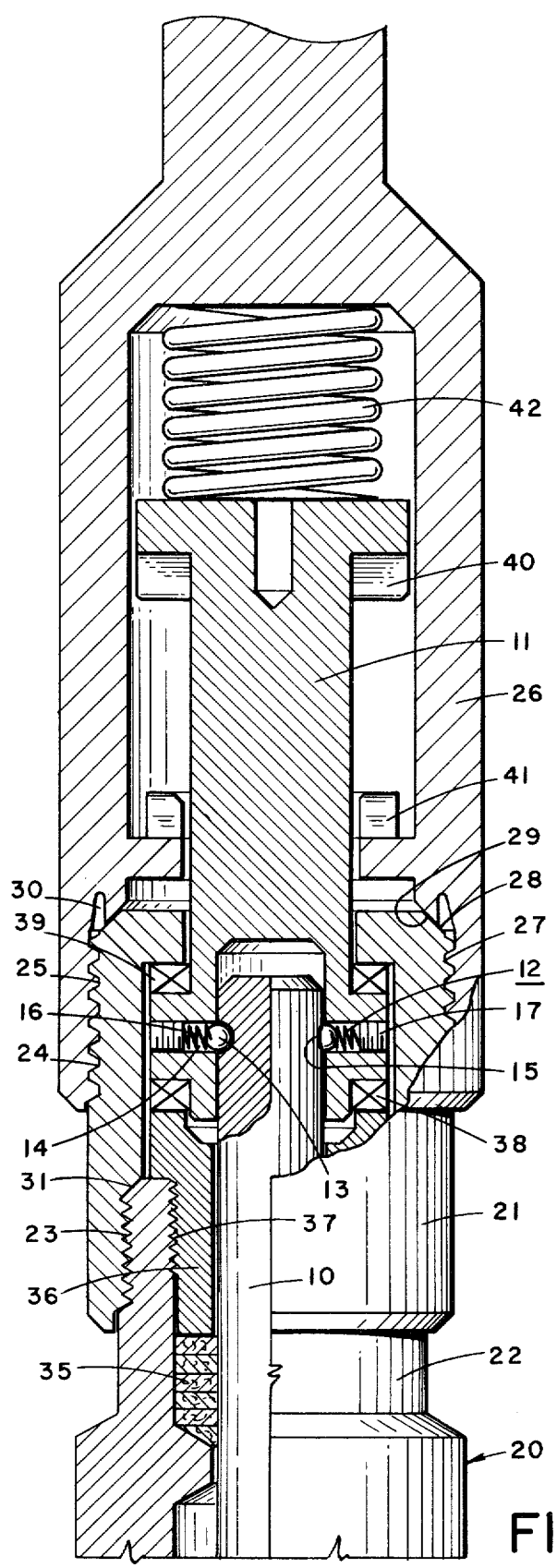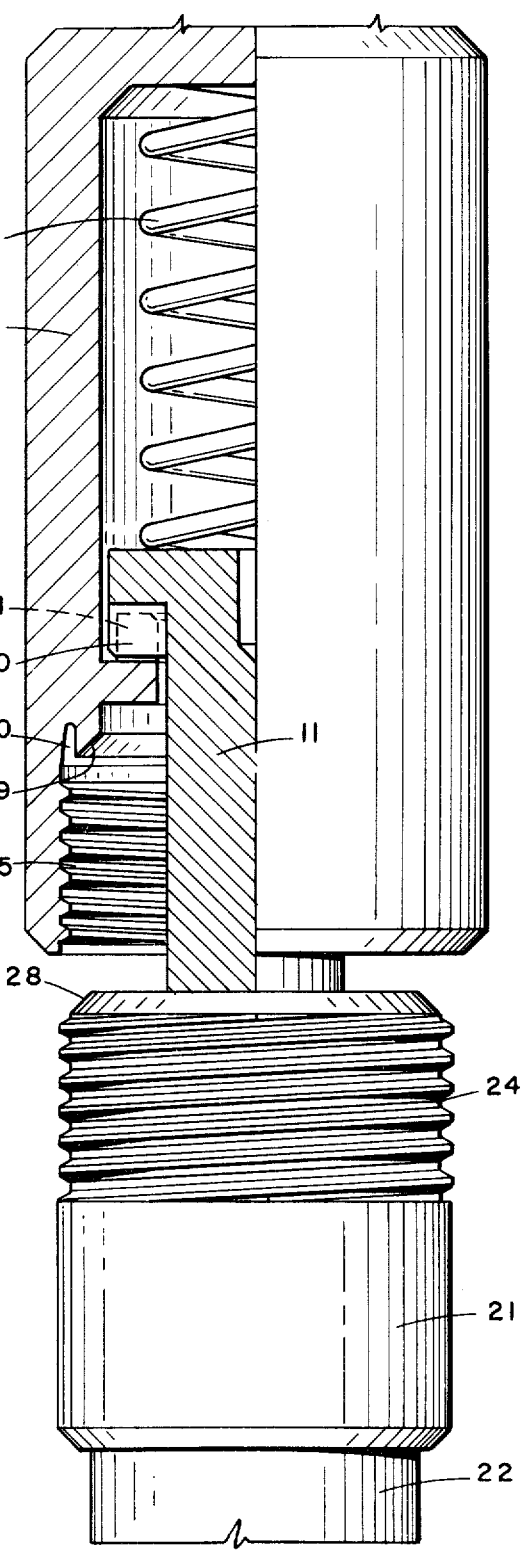
FIG. 1.
FIG. 2.

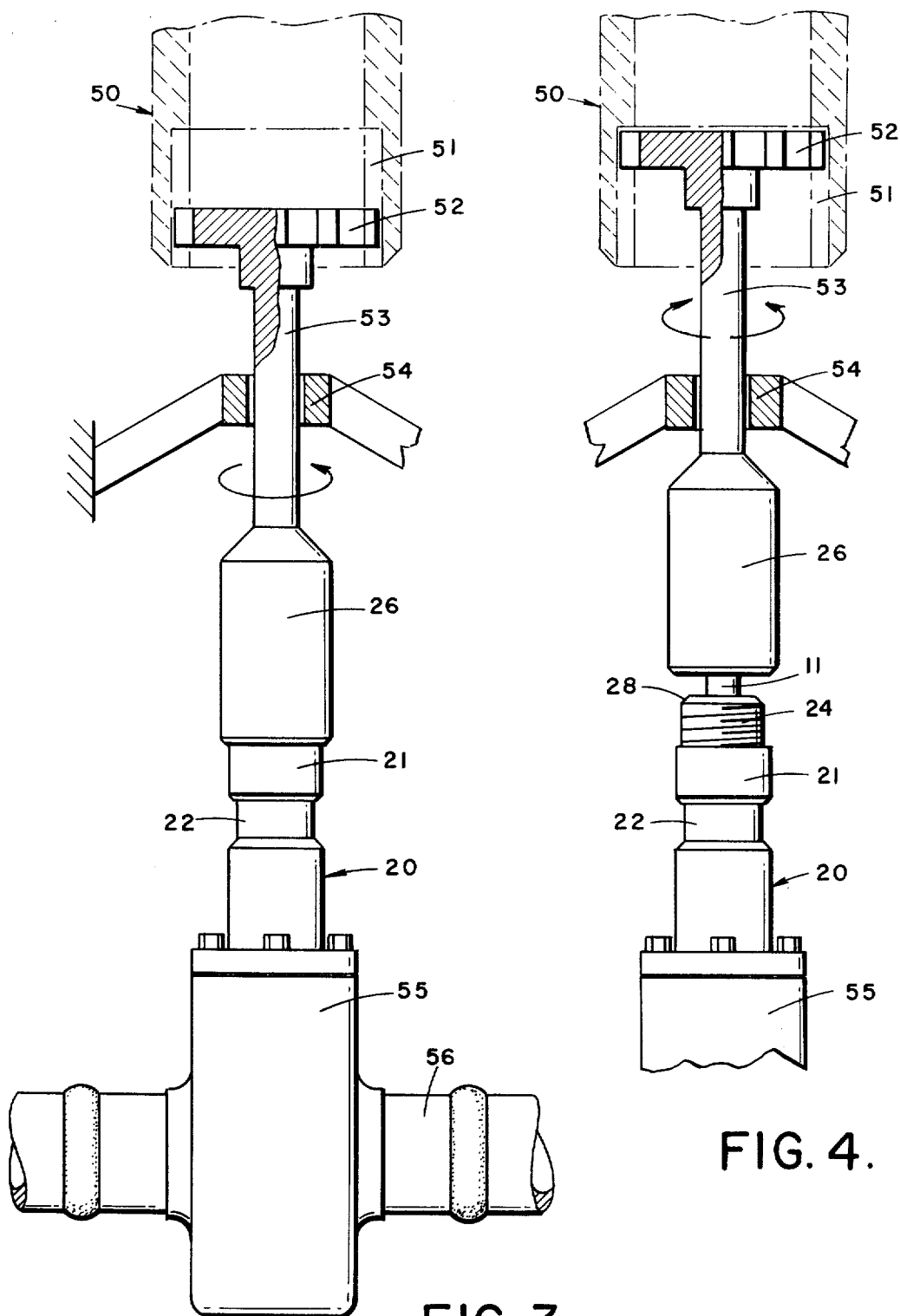

VALVE STEM STATIC SEAL SYSTEM

BACKGROUND OF THE INVENTION

The present invention concerns a valve stem system and, in particular, a valve stem system which is manipulator operable and designed for use on flowlines in submerged oil and/or gas production systems. Valves used in such systems are not easily repaired or replaced. Failure mode analysis which has been conducted indicates that the most likely failure would arise in the valve stem packing and, consequently, to improve the reliability of the system in which the valves are used it is desirable to eliminate dependency upon the valve stem packing to provide the required seal.

BRIEF DESCRIPTION OF THE INVENTION

In accordance with the teachings of the invention the apparatus includes a valve system having a valve arranged in a subsea flowline and a valve stem attached to the valve for opening and closing the valve upon rotation of the valve stem the improvement comprising a cap member surrounding the valve stem, the cap member and the valve system containing metal-to-metal sealing surfaces which mate and sealingly isolate the valve stem from the surrounding sea water environment. The invention also includes a method for remotely opening and closing the subsea valve which comprises the steps of connecting an effector to the cap member and rotating the effector to cause rotation of the cap member and connection of the cap member with the valve bonnet to effect the metal-to-metal seal between the cap member and the valve bonnet to isolate the valve stem from the surrounding water environment.

BRIEF DESCRIPTION OF THE DRAWINGS

FIG. 1 is an elevation view of the valve stem static seal system in one position;

FIG. 2 is an elevation view of the valve stem static seal system in another position;

FIG. 3 is an elevation view of the valve stem static seal system shown in the position of FIG. 1 with the manipulator effector apparatus connected to it; and FIG. 4 is an elevation view of the valve stem static seal system shown in the position of FIG. 2 with the manipulator effector apparatus connected to it.

DESCRIPTION OF THE PREFERRED EMBODIMENTS

The valve stem static seal system is shown in detail in FIGS. 1 and 2. A nonrising valve stem 10 is connected at one end to a gate valve, not shown, and at its other end to a valve stem extension shaft 11, preferably by means of the detent clutch arrangement 12. In that arrangement a ball 13 positioned at the inner end of each hole 14 formed in extension shaft 11 is urged into each hollow 15 formed in the surface of valve stem 10 by a spring 16 backed by a plug 17 screwed into the outer end of hole 14. One or more detent clutches may be used.

A valve bonnet 20 surrounds a portion of valve stem 10 and includes two parts 21 and 22 threaded together as indicated at 23. Bonnet part 21 has external threads 24 which engage internal threads 25 of a cap member 26, as at 27, and is provided with a slanted or tapered sealing surface 28 which meets with a slanted or tapered sealing surface 29 provided on cap member 26 to form a metal-to-metal seal when cap member 26 is completely made up on valve bonnet 20. An annular recess 30 is formed in cap member 26 to achieve a more effective wedge-type seal. Bonnet part 21 has another tapered sealing surface which engages a mating tapered sealing surface formed on bonnet part 22 to form a seal as at 31. Valve stem packing 35 is arranged within bonnet part 22 and surrounds valve stem 10. A bearing cap 36 surrounds valve stem 10 and is thread locked to bonnet part 22 as at 37 to prevent rotation of the bearing cap. Cap 36 retains packing 35 and supports thrust bearings 38 which together with thrust bearings 39 permit extension shaft 11 to rotate relative to valve bonnet 20. Extension shaft 11 extends into the interior of cap member 26 and contains a spline 40 which is engageable with a spline clutch 41 formed within cap member 26. A coil spring 42 is arranged in cap member 26 and operates to push cap member 26 and its spline clutch 41 outward to engage spline 40 and spline clutch 41, as shown in FIG. 2.

Referring to FIGS. 3 and 4 a manipulator effector or socket wrench 50 contains a splined end 51 for engagement with a splined wheel or handle 52 which is connected to an extension 53 of cap member 26. Bracket-type support structure 54 is shown arranged about extension 53. Valve bonnet 20 is mounted on a valve housing 55 which in turn is arranged on a flowline or pipe 56. The arrowed lines indicate the direction of rotation of cap member 26.

Referring to FIGS. 1 to 4, in operation, a manipulator effector 50 is positioned on the splined handle 52 and rotated to cause rotation of the extension 53 and cap member 26. Rotation counterclockwise, as indicated in FIG. 3, causes cap 26 to back off and be removed from bonnet 20. The metal-to-metal seal between surfaces 28 and 29 is thereby broken. When the cap threads 25 disengage from the bonnet threads 24 coil spring 42 pushes cap member 26 and its spline clutch 41 outward to engage valve stem spline 40. When thus engaged extension shaft 11 may be rotated by rotating extension shaft 53, as indicated by the arrowed lines in FIG. 4, and cap member 26 to open or close the gate valve as desired. The use of a clutch, such as the detent clutch arrangement 12, is optional. When such a clutch is used it protects the gate valve from over-torque.

After the valve has been placed in its desired position the manipulator effector 50 pushes on extension shaft 53 and cap member 26 to disengage spline clutch 41 and valve stem spline 40. Clockwise rotation and axial pressure on extension shaft 53 engages threads 25 of cap member 26 on threads 24 of bonnet part 21 and reestablishes the seal on surfaces 28 and 29.

A knuckle joint, not shown, may be used in extension shaft 53 to overcome possible misalignment problems.

Changes and modifications may be made in the illustrative embodiments shown and described herein without departing from the scope of the invention as defined in the appended claims.

Having fully described the apparatus, operation, objects and advantages of our invention we claim:

1. A valve stem system for use with a subsea valve located in a flowline comprising:

a valve stem attachable to said valve for opening and closing said valve upon rotation of said valve stem;

a valve bonnet mounted on said flowline and surrounding a section of said valve stem;

a cap member threadedly engagable with and removable from said valve bonnet; said cap member and said valve bonnet containing sealing surfaces adapted to mate and form a metal-to-metal seal therebetween when said cap member is threaded onto said valve bonnet;

another section of said valve stem extending into said cap member and being provided with a spline;

a spline clutch arranged on the interior of said cap adapted to engage said valve stem spline when said cap is removed from said valve bonnet;

biasing means for urging said spline clutch into engagement with said valve stem spline when said cap member is removed from said valve bonnet; and bearing means surrounding said valve stem in said valve bonnet to permit rotation of said valve stem relative to said valve bonnet, rotation of said cap causing rotation of said valve stem when said cap member is removed from said valve bonnet.

2. A valve stem system as recited in claim 1 in which said valve stem sections are separate members and including means to permit said one section to be disconnected from said other section in the event of over-torque.

3. A valve stem system as recited in claim 2 in which said means to disconnect said valve stem sections includes a detent clutch arrangement.

4. A valve stem system as recited in claim 3 in which said valve stem is a nonrising type valve stem.

5. A valve stem system as recited in claim 4 including resilient packing arranged about said valve stem within said valve bonnet.

6. A valve stem system as recited in claim 4 in which said biasing means comprises a coil spring.

7. A valve stem system as recited in claim 1 in which each of said sealing surfaces is tapered, said cap member having an annular groove formed about said sealing surface formed thereon to aid in achieving a wedge-type seal.

8. A valve stem system for use with a subsea valve comprising:

a valve stem attachable to said valve for opening and closing said valve upon rotation of said valve stem in one direction and in a reverse direction, respectively;

a valve bonnet surrounding said valve stem;

packing surrounding said valve stem;

a cap member threadedly engageable with and removable from said valve bonnet, said cap member and said valve bonnet containing mating slanted metal sealing surfaces to form a metal-to-metal seal therebetween when said cap member is threaded onto said valve bonnet; and an annular groove in said cap member formed about said sealing surface of said cap member to aid in achieving a wedge-type seal between said cap member and said valve bonnet.

9. A system as recited in claim 8 including means connecting said cap member to said valve stem when said cap member is disengaged from said valve bonnet such that rotation of said cap member rotates said valve stem, said means disengaging said cap member from said valve stem when said cap member is threaded onto said valve bonnet.'

10. Apparatus for use in a subsea flowline including a valve system having a valve arranged in said flowline, a valve stem attached to said valve for opening and closing said valve upon rotation of said valve stem, a bonnet mounted on said flowline and surrounding a section of said valve stem and resilient packing arranged about said valve stem within said bonnet, the improvement comprising:

a cap member surrounding said valve stem and secured to said bonnet, said cap member and said valve member system containing slanted metal sealing surfaces adapted to mate and sealingly isolate said valve stem packing from said surrounding sea water environment; and an annular groove in said cap member formed about said sealing surface of said cap member to aid in achieving a wedge-type seal between said cap member and said valve bonnet.

* * * * *